(12) United States Patent
Sudhakar et al.

(10) Patent No.: US 10,051,073 B1
(45) Date of Patent: Aug. 14, 2018

(54) CLOUD INFORMATION SERVICES

(75) Inventors: Muddu Sudhakar, Milpitas, CA (US);
Christos Tryfonas, San Carlos, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1178 days.

(21) Appl. No.: 12/982,993

(22) Filed: Dec. 31, 2010

(51) Int. Cl.
G06F 15/16 (2006.01)
H04L 29/08 (2006.01)
H04L 29/06 (2006.01)

(52) U.S. Cl.
CPC ........ H04L 67/28 (2013.01); H04L 29/06619 (2013.01); H04L 29/08702 (2013.01)

(58) Field of Classification Search
CPC .............. H04L 67/28; H04L 29/08702; H04L 29/06619
USPC ........................................................ 709/223
See application file for complete search history.

(56) References Cited

U.S. PATENT DOCUMENTS

| | | | | |
|---|---|---|---|---|
| 7,703,125 B2* | 4/2010 | Motoyama | .......... | G06F 21/6209 715/255 |
| 7,730,148 B1* | 6/2010 | Mace | .................. | G06Q 10/107 709/206 |
| 8,056,131 B2* | 11/2011 | Radatti et al. | .................. | 726/23 |
| 8,166,164 B1* | 4/2012 | Luna | ...................... | H04L 67/22 709/203 |
| 8,601,097 B2* | 12/2013 | Sartori | ......................... | 709/219 |
| 2006/0031357 A1* | 2/2006 | Misra | ...................... | H04L 51/22 709/206 |
| 2010/0191783 A1* | 7/2010 | Mason et al. | .................. | 707/822 |
| 2010/0318665 A1* | 12/2010 | Demmer et al. | .............. | 709/227 |
| 2010/0325199 A1* | 12/2010 | Park et al. | ..................... | 709/203 |
| 2010/0333116 A1* | 12/2010 | Prahlad et al. | ............... | 719/328 |
| 2011/0208837 A1* | 8/2011 | Sartori | .......................... | 709/219 |
| 2011/0264907 A1* | 10/2011 | Betz et al. | ..................... | 713/153 |
| 2012/0016845 A1* | 1/2012 | Bates | ............................ | 707/692 |

* cited by examiner

*Primary Examiner* — Tu Nguyen
(74) *Attorney, Agent, or Firm* — Workman Nydegger

(57) ABSTRACT

A method, article of manufacture, and apparatus for processing data. In some embodiments, this includes determining a policy, intercepting communication between a user and a cloud service provider, applying the determined policy to the intercepted communication, storing at least a portion of the intercepted communication in an intermediary. In some embodiments, information stored in the intermediary may be retrieved without the cloud service provider.

20 Claims, 2 Drawing Sheets

CLOUD INFORMATION SERVICES

FIELD OF THE INVENTION

The present invention relates generally to data systems, and more particularly, to systems and methods of efficiently processing data.

BACKGROUND OF THE INVENTION

Modern data systems are becoming increasingly geographically diverse. Often referred to as "cloud computing," these data systems typically deliver services through the internet. For example, a server located in one country may be used to provide software or processing power to a client located in another country.

This internet-based infrastructure allows for several benefits, such as sharing of resources, freeing the user from Information Technology (IT) maintenance, improved utilization rates of resources, and platform-independent applications, among others.

However, cloud service providers do not take into account the individual needs of each client.

There is a need, therefore, for an improved method, article of manufacture, and apparatus for processing data in data systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
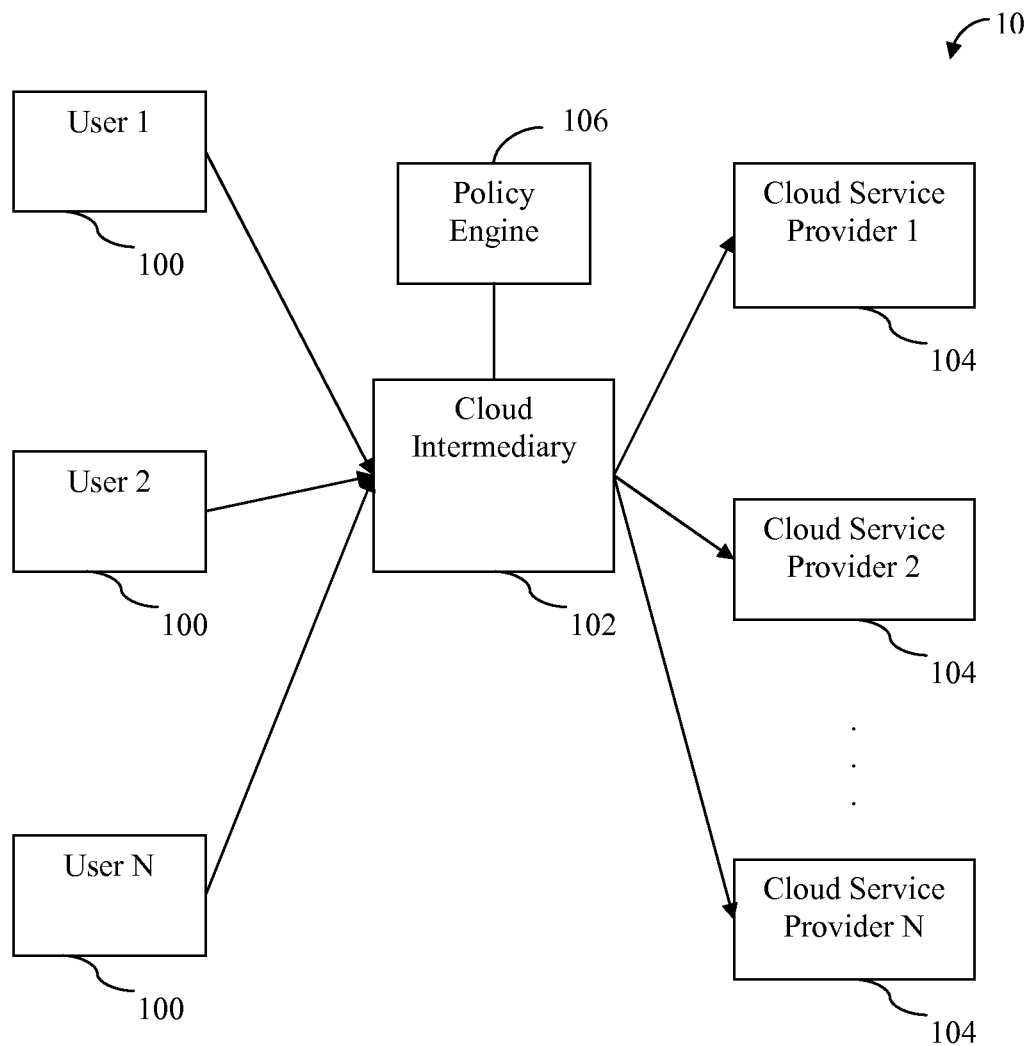
FIG. 1 is a diagram of a data system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

FIG. 1 illustrates a data system in accordance with some embodiments. Data System 10 includes Users 100, Cloud Intermediary 102, Cloud Service Providers 104, and Policy Engine 106. Users 100 access cloud services from Cloud Service Providers 104. For example, Users 100 may be desktop clients. Cloud Service Providers 104 may provide cloud services, such as a word processor delivered via the internet to Users 100, or other Software as a Service (SaaS). Cloud Intermediary 102 intercepts data communication between Users 100 and Cloud Service Providers 104, and processes the data according to Policy Engine 106. Policy Engine 106 contains policies that dictate how to manage the data communication between Users 100 and Cloud Service Providers 104.

Though FIG. 1 illustrates only one cloud intermediary, Data System 10 may include multiple cloud intermediaries. In some embodiments, multiple users may connect to the same cloud intermediary or to different cloud intermediaries. Further, a user may include several physical machines (e.g. a network of desktop clients), or may be a virtual user (e.g. a virtual machine running on a host machine or multiple host machines). Further, though FIG. 1 illustrates Cloud Intermediary 102 to be external to User 100 and Server 104, Cloud Intermediary 102 may reside inside users or cloud service providers, or is local to users or cloud service providers.

Having a cloud intermediary has many benefits. In some embodiments, the cloud intermediary may allow a user to comply with the user's individual data retention needs. For example, suppose a user utilizes a cloud service provider's email services. Further suppose the user is required by law to retain documents for seven years. However, the cloud service provider's email service only retains emails for five years. If the user utilized the email service without a cloud intermediary, the user would not be able to comply with the applicable document retention law. With a cloud intermediary, the user's communication with the email service would be intercepted, and processed according to a policy. In this case, since the user is concerned with data retention, a policy may dictate that all emails be archived to a storage device independent of the service provider, and stored for a period of seven years.

Figure 2:
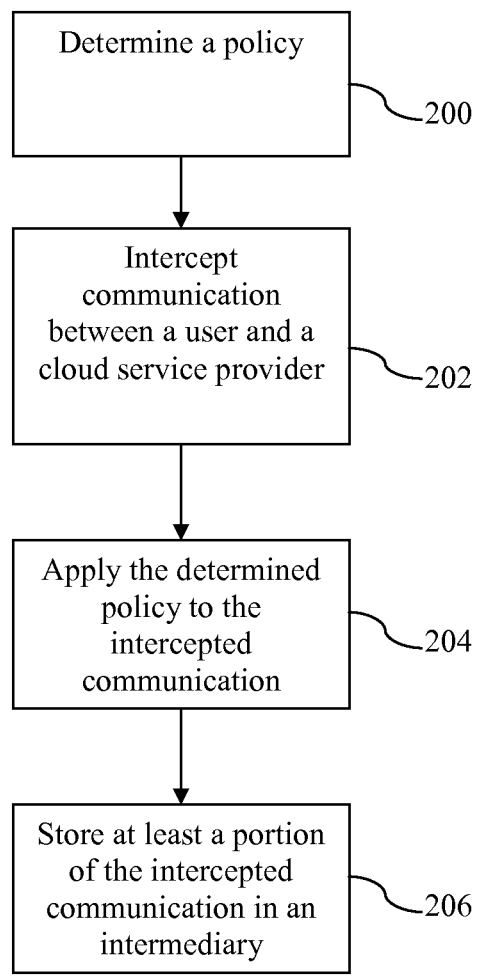
FIG. 2 is a flowchart of a method to process data in accordance with some embodiments.

FIG. 2 illustrates a method to process information in accordance with some embodiments. In step 200, a policy is determined. In step 202, communication between a user and a cloud service provider is intercepted. In step 204, the determined policy is applied to the intercepted communication. In step 206, at least a portion of the intercepted communication is stored in an intermediary. In some embodiments, further steps (not shown) may be taken, such retrieving the stored communication from the intermediary, independent of the cloud service provider.

The cloud intermediary may intercept and process data communication through many methods. In some embodiment, a reverse proxy may be used. For example, if the user accessed wwww.gmail.com for email services, a cloud intermediary may intercept the communication request from the user and redirect it to www.intermediary.com/gmail. Communication from www.gmail.com to the client may also be intercepted by the intermediary. The cloud intermediary may receive the emails, create a copy of the emails, and store the copy in a storage device. Once the emails have been copied, the cloud intermediary may pass through the communication to www.gmail.com, or to the user depending on if the mail is outbound or inbound.

By retaining a copy of data, a cloud intermediary may also assist with data access. For example, a user may be in litigation and required to produce documents for a discovery request. If the user requested relevant data from a cloud service provider, it may take a large amount of time, and may be expensive for the cloud service provider to locate and produce the data. By having a cloud intermediary retain a copy of the data, the user could locate the data easily in the cloud intermediary, and would not need the assistance of the cloud service provider.

In some embodiments, a user may use several cloud service providers. For example, a user may use one cloud service provider for email, one cloud service provider for word processing, and one cloud service provider for customer relationship management (CRM) products. These cloud service providers may have different data retention periods, different security protocols, and other differing characteristics. This may present a problem to a user who requires all data policies be unified, or to potential users who are accustomed to having IT in-house. In some embodiments, a cloud intermediary may be used to intercept the data communication from the user to all the cloud service providers used by the user. For example, the cloud intermediary may intercept all data communication to www.CRM-.com and redirect it to www.intermediary.com/CRM, all data communication to www.email.com and redirect to www.intermediary.com/email, and so on. Depending on policy, several actions may be taken. For example, before allowing email to go to www.email.com, the cloud intermediary may authenticate the user depending on policy. If the user's security credentials are adequate, the email may be copied, and allowed to pass through to www.email.com. If not, the cloud intermediary may retain the email, flag the email and notify the appropriate person of a potential security breach.

In some embodiments, the cloud intermediary may be used to retain different versions of the same document. For example, suppose a user used a cloud service provider to create spreadsheets. One spreadsheet may be financial_report.xls. The cloud service provider may only retain one copy of financial_report.xls (e.g. the most recent copy). If the user desired to access an older copy of the financial_report.xls because the most recent version contained an accounting error, the cloud service provider would be unable to provide the user with the older and correct spreadsheet. The cloud intermediary may be used to implement a policy which dictates that multiple versions of a document be kept, allowing the user to search the cloud intermediary for the desired version of the file.

Policies may be used to determine which data a user is able to view in the intermediary, as well as which data is stored. For example, a policy may dictate that a user may view only his or her data stored in the intermediary. In some embodiments, this may be accomplished through a user interface that requires a user to input authentication information, such as a username and password. Once authorized, a user may be able to see all data that is owned by the user. Administrator users (e.g. users with access to see all data) may be preferable in some cases, such as when a corporation needs to find data stored in the intermediary that is relevant to a discovery request.

In some embodiments, a policy may dictate that only high level employees of a corporation may have a copy of their SaaS data stored in the intermediary, while other employees have a copy of their SaaS metadata stored. For example, when the SaaS is an email provider, metadata may include the email's envelope information. In some embodiments, some users' data and metadata may not be copied at all. This may be preferable when the intermediary's resources (e.g. disk space, bandwidth, etc.) are limited.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A system comprising:
an intermediary device that includes a processor that is used by the system in the management of one or more services provided by a cloud service provider to a user, wherein in operation, the processor executes instructions to:
access a document retention policy which specifies storage information for documents meeting one or more criteria, wherein the documents specified in the document retention policy comprise email;
intercept a communication initiated at one of the user and the cloud service provider and directed by the initiating user or cloud service provider to the other of the user and the cloud service provider, wherein the communication is intercepted by the intermediary device as the communication travels between the user and cloud service provider, wherein the intercepted communication is an email;
process the intercepted communication in accordance with the accessed document retention policy, even when the document retention policy is different from a document retention policy of the cloud service provider regarding the intercepted communication;
store a portion of the intercepted communication at the intermediary device so that the stored portion of the intercepted communication can be subsequently retrieved from the intermediary device by the user;
receive a request from the user to retrieve the stored portion of the intercepted communication; and
provide the stored portion of the intercepted communication to the user upon request by the user, wherein the stored portion of the intercepted communication is provided to the user without involvement by the cloud service provider.

2. The system as recited in claim 1, wherein in operation, the processor further executes instructions to intercept a word processing document as the word processing document travels between the user and cloud service provider.

3. The system as recited in claim 1, wherein the intercepted communication is initiated by the cloud service provider.

4. The system as recited in claim 1, wherein the one or more services provided by the cloud service provider includes any one or more of email services, word processing services, and customer relationship management (CRM) services.

5. The system as recited in claim 1, wherein the intermediary is local either to the user or to the cloud service provider.

6. The system as recited in claim 1, wherein the system is configured such that communications between the user and the cloud service provider pass through the intermediary.

7. The system as recited in claim 1, wherein the intercepted communication is generated in association with the operation of a software as a service (SAAS) application provided by the cloud service provider.

8. The system as recited in claim 1, wherein in operation, the processor further executes instructions to perform one or more of:
redirect the email after receipt from the user or cloud service provider;
copy the email after receipt from the user or cloud service provider; or
after interception, pass the intercepted email to an intended recipient.

9. The system as recited in claim 1, wherein execution of the instructions by the processor to process the intercepted communication in accordance with the document retention policy comprises executing the instructions by the processor to do one or more of:
control user access to a portion of the intercepted communication; or
store multiple versions of the intercepted communication at the intermediary.

10. The system as recited in claim 1, wherein the processor executes instructions to process the intercepted communication in accordance with multiple policies.

11. The system as recited in claim 1, further comprising deleting the stored portion of the intercepted communication when specified by the document retention policy.

12. The system as recited in claim 1, wherein processing the intercepted communication in accordance with the accessed document retention policy comprises retaining the intercepted communication but not passing the intercepted communication on.

13. A non-transitory storage medium having stored therein computer-executable instructions which, when executed by one or more processors, perform management of one or more services provided by a cloud service provider to a user by:
accessing a document retention policy which specifies storage information for documents meeting one or more criteria, wherein the documents specified in the document retention policy comprise email;
intercepting a communication initiated at one of the user and the cloud service provider and directed by the initiating user or cloud service provider to the other of the user and the cloud service provider, wherein the communication is intercepted by the intermediary device as the communication travels between the user and cloud service provider, wherein the intercepted communication is an email;
processing the intercepted communication in accordance with the accessed document retention policy, even when the document retention policy is different from a document retention policy of the cloud service provider regarding the intercepted communication;
storing a portion of the intercepted communication at the intermediary device so that the stored portion of the intercepted communication can be subsequently retrieved from the intermediary device by the user;
receiving a request from the user to retrieve the stored portion of the intercepted communication; and
providing the stored portion of the intercepted communication to the user upon request by the user, wherein the stored portion of the intercepted communication is provided to the user without involvement by the cloud service provider.

14. The non-transitory storage medium as recited in claim 13, wherein in operation, the one or more processors further execute instructions to intercept a word processing document as the word processing document travels between the user and the cloud service provider.

15. The non-transitory storage medium as recited in claim 13, wherein the intercepted communication is initiated by the cloud service provider.

16. The non-transitory storage medium as recited in claim 13, wherein the one or more services provided by the cloud service provider includes any one or more of email services, word processing services, and customer relationship management (CRM) services.

17. The non-transitory storage medium as recited in claim 13, wherein processing the intercepted communication in accordance with the document retention policy comprises one or more of:
controlling user access to a portion of the intercepted communication; or
storing multiple versions of the intercepted communication at the intermediary.

18. The non-transitory storage medium as recited in claim 13, wherein processing the intercepted communication in accordance with the document retention policy comprises one or more of:
redirecting the email after receipt from the user or cloud service provider;
copying the email after receipt from the user or cloud service provider; or
after interception, passing the intercepted email to an intended recipient.

19. The non-transitory storage medium as recited in claim 13, wherein the intercepted communication is processed in accordance with multiple policies.

20. The non-transitory storage medium as recited in claim 13, wherein the intercepted communication is generated in association with the operation of a software as a service (SAAS) application provided by the cloud service provider.

* * * * *

UNITED STATES PATENT AND TRADEMARK OFFICE
CERTIFICATE OF CORRECTION

| | |
|---|---|
| PATENT NO. | : 10,051,073 B1 |
| APPLICATION NO. | : 12/982993 |
| DATED | : August 14, 2018 |
| INVENTOR(S) | : Sudhakar et al. |

It is certified that error appears in the above-identified patent and that said Letters Patent is hereby corrected as shown below:

In the Specification

Column 3
Line 1, change "Server" to –Cloud Service Providers–

Signed and Sealed this
Ninth Day of April, 2019

Andrei Iancu
*Director of the United States Patent and Trademark Office*